H. W. BROWN.
METER SWITCH.
APPLICATION FILED JUNE 28, 1911.

1,171,586.

Patented Feb. 15, 1916.
5 SHEETS—SHEET 1.

WITNESSES:
C. L. Belcher
Otto S. Schairer

INVENTOR
Harold W. Brown
BY
Keley G. Carr
ATTORNEY

H. W. BROWN.
METER SWITCH.
APPLICATION FILED JUNE 28, 1911.

1,171,586.

Patented Feb. 15, 1916.
5 SHEETS—SHEET 2.

WITNESSES:
C. L. Belcher
Otto S. Schairer

INVENTOR
Harold W. Brown
BY
Chiley G. Carr
ATTORNEY

THE COLUMBIA PLANOGRAPH CO., WASHINGTON, D. C.

H. W. BROWN.
METER SWITCH.
APPLICATION FILED JUNE 28, 1911.

1,171,586.

Patented Feb. 15, 1916.
5 SHEETS—SHEET 3.

WITNESSES:
C. L. Belcher
Otto S. Schairer

INVENTOR
Harold W. Brown
BY
Wesley G. Carr
ATTORNEY

THE COLUMBIA PLANOGRAPH CO., WASHINGTON, D. C

H. W. BROWN.
METER SWITCH.
APPLICATION FILED JUNE 28, 1911.

1,171,586.

Patented Feb. 15, 1916.
5 SHEETS—SHEET 4.

WITNESSES:
C. L. Belcher
Otto J. Schairer

INVENTOR
Harold W. Brown
BY
Wesley G. Carr
ATTORNEY

H. W. BROWN.
METER SWITCH.
APPLICATION FILED JUNE 28, 1911.

1,171,586.

Patented Feb. 15, 1916.
5 SHEETS—SHEET 5.

WITNESSES:
C. L. Belcher
Otto S. Schairer.

INVENTOR
Harold W. Brown
BY
Wesley G. Carr
ATTORNEY

UNITED STATES PATENT OFFICE.

HAROLD W. BROWN, OF WILKINSBURG, PENNSYLVANIA, ASSIGNOR TO WESTINGHOUSE ELECTRIC AND MANUFACTURING COMPANY, A CORPORATION OF PENNSYLVANIA.

METER-SWITCH.

1,171,586. Specification of Letters Patent. Patented Feb. 15, 1916.

Application filed June 28, 1911. Serial No. 635,907.

*To all whom it may concern:*

Be it known that I, HAROLD W. BROWN, a citizen of the United States, and a resident of Wilkinsburg, in the county of Allegheny and State of Pennsylvania, have invented a new and useful Improvement in Meter-Switches, of which the following is a specification.

My invention relates to meter switches or controllers, and particularly to such switches as are adapted to so change the connections of a single ammeter or other instrument that it may be utilized to successively measure the currents, or other quantities pertaining to different circuits or the several phases of a polyphase electrical circuit.

The object of my invention is to provide a switch or controller of the character and for the purpose indicated which shall be simple in construction, effective in use and adjustable to conform to a large number of metering conditions, and which shall permit of successively associating a single meter with several circuits or phases of a circuit, or of entirely disassociating it from all of them, as desired.

Figure 1:
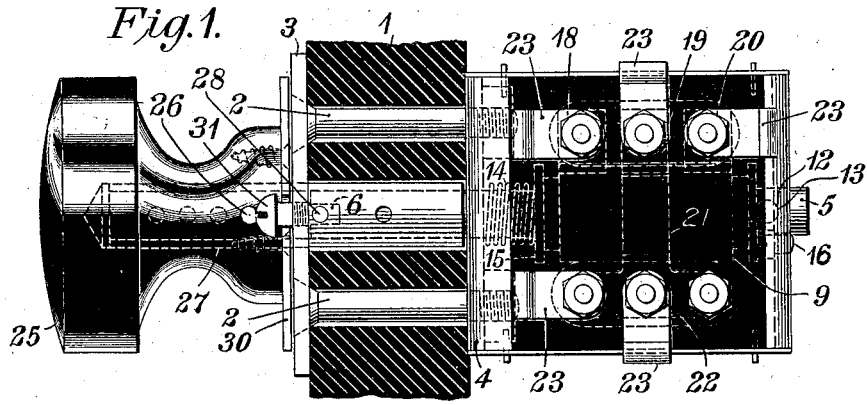
Figure 2:
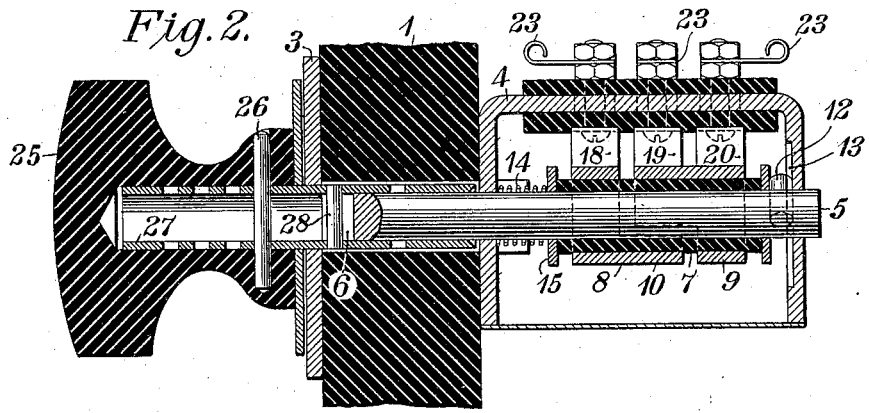
Figure 3:
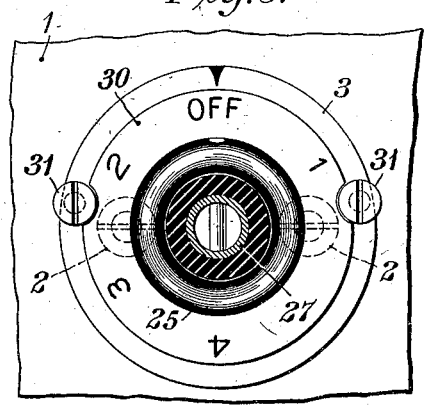
Figure 4:
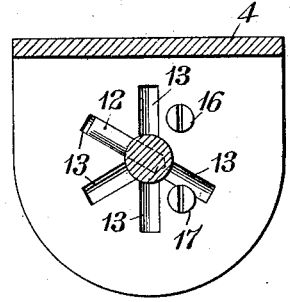
Figure 5:
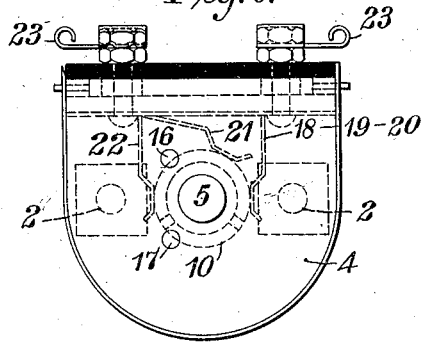
Figure 15:
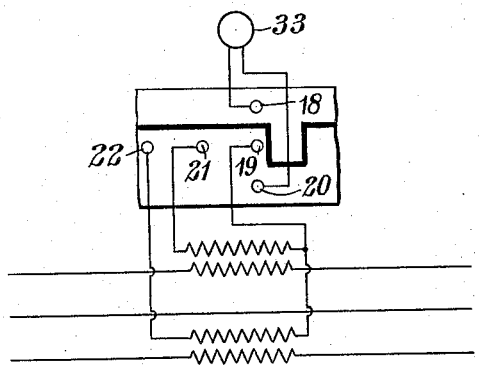
Figure 16:
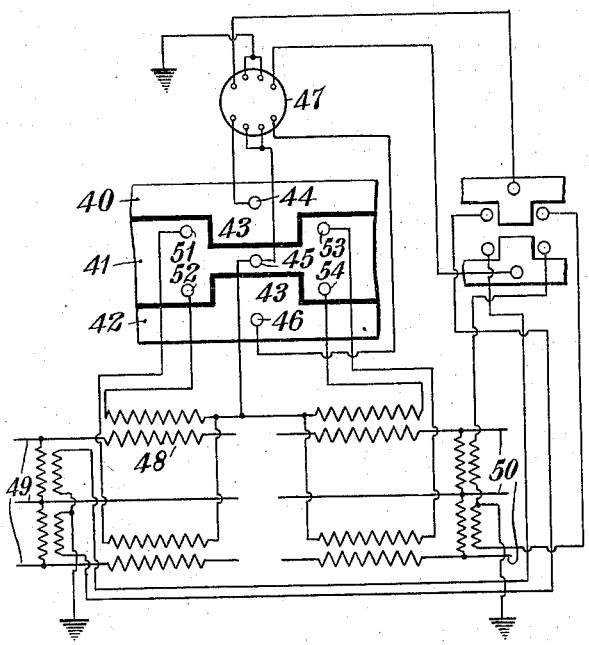
Figure 17:
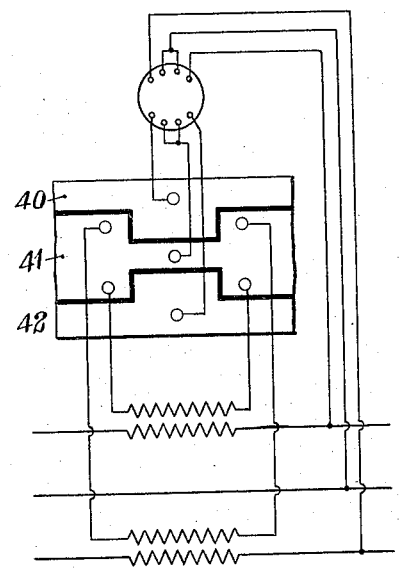

The invention is illustrated in the accompanying drawings, Figure 1 of which is a plan and sectional view, Fig. 2 is a vertical sectional view, and Fig. 3 is a view, in front elevation and in section, of a device that is constructed in accordance therewith. Fig. 4 is a view, in elevation and in section, of certain of the rear portions of the switch. Fig. 5 is a rear elevation of the switch. Figs. 6 to 14ª, inclusive, are diagrammatic views illustrating various uses, connections and positions of the switch. Fig. 15 is a diagrammatic view of a modified form of the switch, and Figs. 16 and 17 are diagrammatic views of still further modifications and applications of the switch.

As the switch is particularly adapted for use with switch-board instruments, it is shown as mounted upon a switch-board 1, to which it is secured by means of screws 2 that project through the board and a washer 3 upon its front face and into one leg of an inverted U-shaped bracket 4 upon the rear of the board. Rotatably mounted in the legs of the U-shaped bracket 4, is a rod or shaft 5 that extends nearly through the switch board panel 1 and is provided in its inner end with a slot 6. A part of the shaft 5 is surrounded by an insulating sleeve 7 upon which are secured two adjacent cylindrical segments 8 and 9, the segment 8 being provided with a lateral extension 10 that partially occupies a corresponding opposite recess in the segment 9. The adjacent segments are, therefore, of zig-zag contour and may be said to partially overlap.

In order to accentuate the positions of the shaft 5 and segments 8 and 9, which constitute the switch drum, a laterally projecting pin 12 is secured in the rear end of the shaft 5 and thus constitutes a boss or projection that is adapted to occupy recesses 13 in the inner face of the rear leg of the U-shaped bracket 4, the recesses 13 corresponding to the various positions of the drum. As the shaft 5 is rotated and the pin 12 moves from one recess into another, the shaft is given a slight longitudinal or axial movement which is opposed by a helical compression spring 14 that is interposed between the front leg of the U-shaped bracket 4 and a collar 15 upon the shaft. The pin 12 is thus resiliently forced into the recess 13 and the various positions of the controller drum are thereby accentuated.

The degree of rotation of the controller drum may be limited by screws 16 and 17 that are threaded in the rear leg of the U-shaped bracket 4 and are interposed in the path of movement of the pin 12 to constitute stops therefor. These stops, however, may be omitted in some instances, as their use is not always necessary or desirable, as will be hereinafter more fully explained.

The drum segments 8 and 9 are adapted to be engaged by a plurality of contact fingers or terminal members 18, 19, 20, 21 and 22, respectively, that are secured to, but are insulated from, the U-shaped bracket 4, and are each provided with a clip 23 for permitting of convenient connection thereof to circuit conductors.

The terminal member 18 is adapted to engage only the segment 8 and the terminal member 20 is adapted to engage only the segment 9, whereas, the remaining terminal members 19, 21 and 22 are disposed adjacent to the overlapping portions of the said segments, and are, accordingly, adapted to engage either of them, according to their positions. The terminal members 19 and 21 are spaced apart a less angular distance than the angular width of the extension 10 of the segment 8, so that they may accordingly engage the same simultaneously. However, no other two terminal members may engage the said extension simultaneously, because they are spaced too far apart.

The shaft 5 and controller drum are actuated by a knob 25 upon the front of the switch-board, which knob is secured, by means of a pin 26, upon one end of a tube 27 having a plurality of apertures for the reception of a pin 26, in order that the actuating device may be adapted for different thicknesses of switch-board panels. One end of the tube 27 fits over the front end of the shaft 5 and is provided with a transverse pin 28 that extends into the slot 6 in the end of the shaft 5. The tube 27 may also be provided with a plurality of apertures for the reception of the pin 28 to provide further adjustability for different thicknesses of switch-board panels. Secured to the rear face of the knob 25, is a plate 30 having position-indicating numerals or other marks upon its front face and two notches in its edge that register with screws 31 when the controller drum is in its off or initial position, the said screws serving to prevent removal of the actuating device when the controller drum occupies other positions. By reason of this arrangement, and also by reason of the peculiar arrangement of connections, one ammeter or other instrument may be employed in connection with a plurality of circuits and switches, as, by providing but a single operating handle for all of the switches, the instrument can then be used with only one circuit or switch at a time.

The manner in which the device is used in connection with an ammeter 33 or other instrument is shown diagrammatically in Figs. 6 to 14ª, inclusive, in all of which the ammeter 33 or other instrument is connected to terminal members 18 and 20 and is adapted to be connected in the secondary circuit of one or more series transformers that are connected in the proper phases of polyphase circuits.

Figure 6:
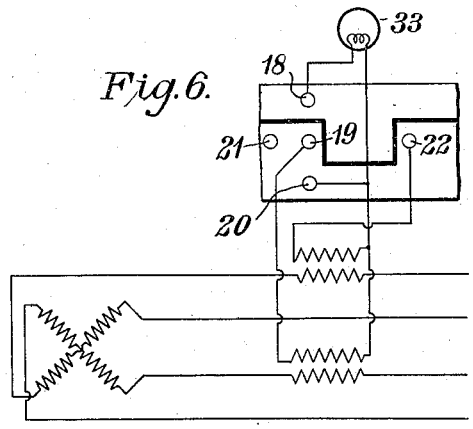
Figure 6A:
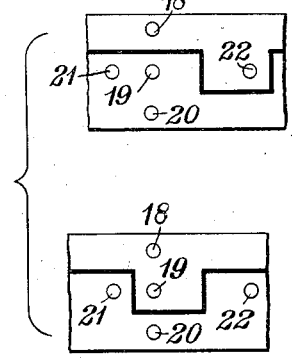

In Fig. 6, the device is shown as used in connection with a two-phase circuit having a primary winding of a series transformer in circuit with one conductor of each phase, terminals of the secondary windings of the transformers being connected together and to the terminal member 20, and the remaining terminals of the said secondary windings being respectively connected to terminal members 19 and 22. The positions which the controller drum should occupy for the measurements of the currents of the respective phases are shown diagrammatically in Fig. 6ª.

Figure 7:
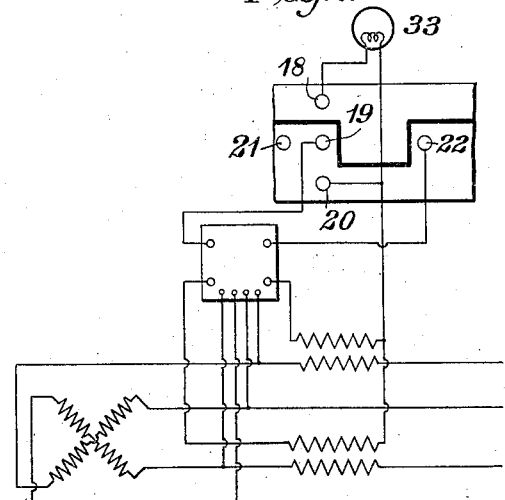

In Fig. 7, the series coils of a wattmeter are introduced in the connections of the secondary windings of the series transformers to the terminal members 19 and 22.

Figure 8:
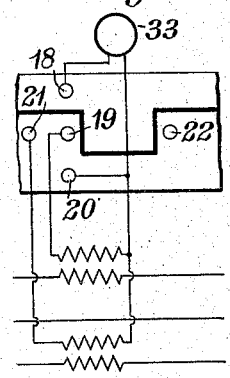
Figure 8A:
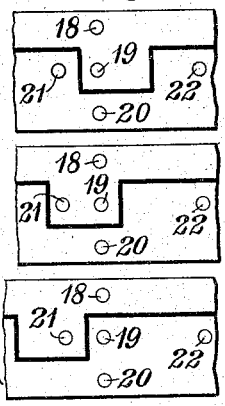

In Fig. 8, the device is shown as employed in connection with a three-phase three-wire circuit having the primary windings of two series transformers in circuit respectively with two conductors thereof. Terminals of the secondary windings of a series transformer are respectively connected to terminal members 19 and 21, and the remaining terminals are connected together and to terminal member 20. The positions of the controller drum for the measurement of the currents of the respective phases are shown in Fig. 8ª. The arrangement of connections shown in Fig. 8 is adapted for use in connection not only with three-phase three-wire systems, but also with two-phase three-wire systems when it is desired to measure the current in the return circuit conductor.

Figure 9:
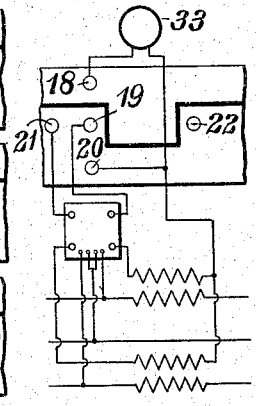

A wattmeter may also be used when the device is employed in connection with a three-phase three-wire system or a two-phase three-wire system, as shown in Fig. 9, the series coils of the wattmeter being simply included in the connections between the secondary windings of the series transformers and the terminal members 19 and 21.

Figure 10:
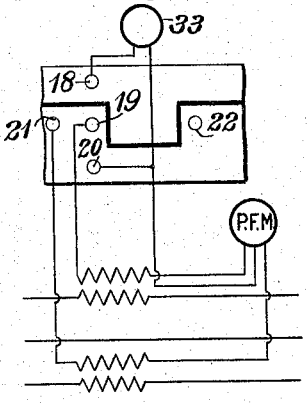

If, in addition to an ammeter in connection with a three-phase three-wire system or a two-phase three-wire system, it is desired to use a power factor meter having a polyphase current winding, or any other instrument in which the secondary circuits of the series transformers are interconnected, the arrangement of the connections may be as shown in Fig. 10, in which terminals of the secondary windings of the series transformer are respectively connected to terminal members 19 and 21, as before, and the remaining terminals are connected to the terminals of the power factor or other meter, instead of directly to each other, a third terminal of the power factor meter being connected to terminal member 20 of the switch. It will, of course, be understood, in this case, that the equivalents of the connections previously made are made within the power factor meter, itself.

Figure 11:
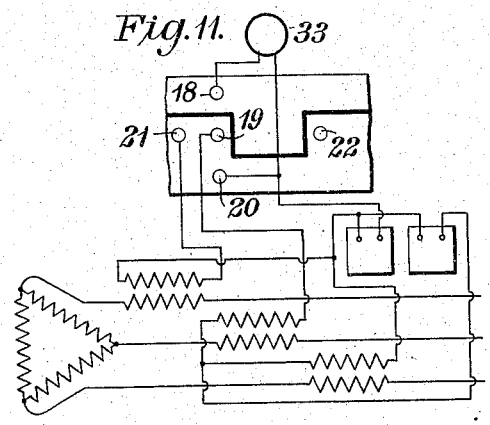
Figure 11A:
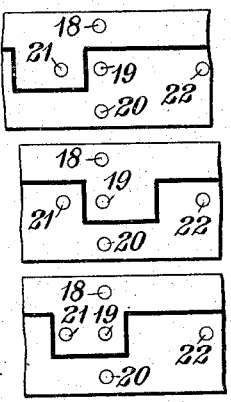

A switch may also be employed when relay devices, that are adapted to operate circuit breakers or other apparatus, are supplied from the secondary windings of series transformers connected in Z-relation; that is, when they are connected in delta with one of the legs of the delta reversed with respect to its usual relation. Such a system of connections is shown in Fig. 11, in which a series transformer is employed in connection with each conductor of a three-phase three-wire circuit, three transformers being necessary only by reason of the use of the relays and for supplying them only, as the meter is supplied from only two of them. Fig. 11ª shows diagrammatically the positions of the controller drum for the measurement of the currents of the respective phases of the circuit.

Figure 12:
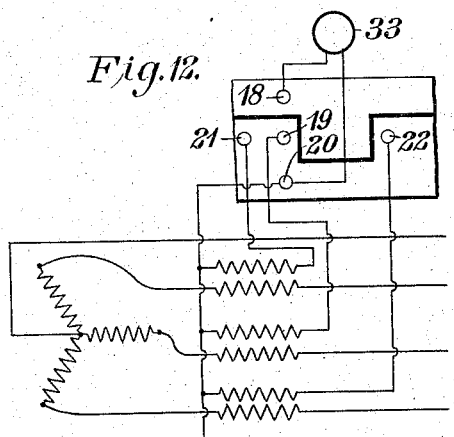
Figure 12A:
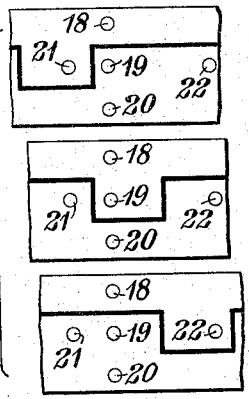

Fig. 12 illustrates the connections for metering the currents of a three-phase four-wire circuit when it is desired to supply no other meters from the secondaries of the series transformers. Fig. 12ª illustrates, diagrammatically, the positions of the controller drum for the measurement of the currents of the respective phases of the said circuit.

Figure 13:
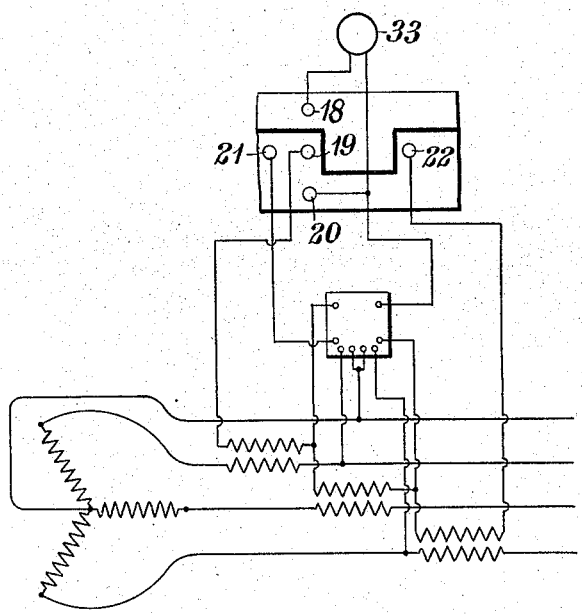
Figure 13A:
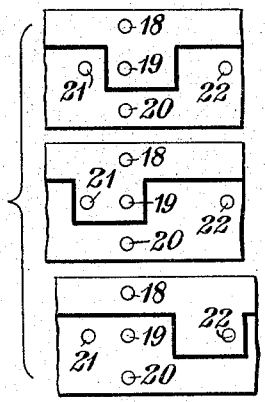

In Fig. 13, a wattmeter is employed in addition to the ammeter in connection with a three-phase four-wire circuit and the positions of the controller drum for the measurement of the currents of the respective phases of the circuit are shown in Fig. 13ª. With this arrangement of connections, the stop screws 16 and 17 should be employed in order to prevent the terminal member 21 from alone engaging the extension 10 of the segment 8, as, otherwise, the ammeter would be overloaded.

Figure 14:
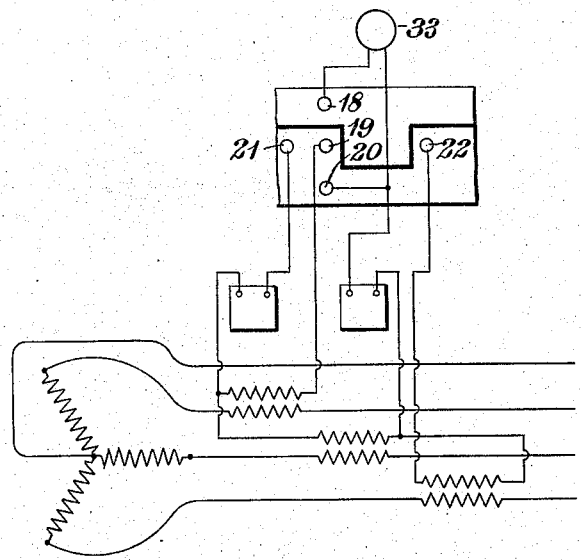
Figure 14A:
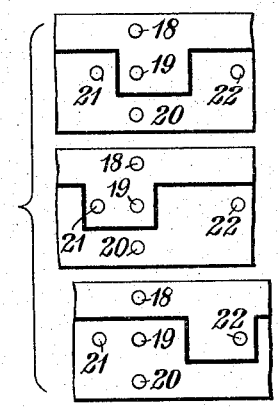

Fig. 14 illustrates the arrangement of connections when relay devices are employed in connection with a three-phase four-wire system, and the secondary windings of the series transformers are connected in Z-relation. Fig. 14ª illustrates the positions of the switch drum for the metering of the currents of the phases.

It will be noted, from all of the above arrangements of connections, that, when the controller drum occupies its off position, the secondary circuits of all of the series transformers are short circuited through the segment 9 of the drum, but, as the drum is moved from the one position to the other, none of the secondary circuits are interrupted, the meter being introduced into the secondary circuits while the continuity of the same is maintained. Except in the cases specifically mentioned, the stop screws 16 and 17 for limiting the angle of movement of the drum may be omitted.

In most cases, a somewhat more simple form of switch may be employed, such, for instance, as that shown in Fig. 15, in which the lateral extension of one of the segments is of such width and the terminal members are so spaced that the said extension may be engaged by only one terminal member at a time. The manner in which this switch should be connected to the circuits will be readily understood from the connections shown for the other switch, it only being necessary to state that the switch of Fig. 15 is not adapted for use when the secondary windings of the series transformers are connected in delta relation, whereas that of Figs. 1 to 14ª is of substantially universal applicability.

By the use of two switches mounted end to end, or otherwise arranged to be operated simultaneously or, preferably, by combining the segments in a single switch in such a manner as to give substantially the same arrangement and disposition of parts, the present switch may be adapted for connecting the current coils of a polyphase wattmeter in the circuits of series transformers that are associated with a plurality of polyphase circuits, substantially as shown in Fig. 16. In this case, the switch comprises three segments 40, 41 and 42, the segments 40 and 42 being provided with opposite lateral projections 43 that extend toward each other into corresponding lateral notches or recesses in the member 41. The segments 40, 41 and 42 are respectively continuously engaged by contact terminals 44, 45 and 46 that are connected to the proper terminals of the series or current coils of a polyphase wattmeter 47. The terminal member 45 is also connected to a common terminal of the secondary windings of series transformers 48 that are associated with the proper conductors of a plurality of polyphase distribution circuits 49 and 50, the remaining terminals of the said secondary windings being connected to stationary contact terminals 51, 52, 53 and 54, all of which normally engage the segment 41. The members 51 and 53 are interposed in the path of movement of the projection 43 of the segment 40, and the members 52 and 54 are similarly interposed in the path of movement of the lateral projection of the segment 42 and, in certain of the positions of the switch, engage the said projection.

It will be seen that, when the projections 43 engage with segments 51 and 52, the current coils of the wattmeter are associated with the circuit 49, and, when the said projections engage the members 53 and 54, the said current coils are associated with the circuit 50. Any suitable means may be employed, such as that shown and covered in a co-pending application, for associating the voltage or shunt coils of the wattmeter with the circuits 49 and 50 at the proper times, either two switches or a single switch being employed as desired. However, when the wattmeter is to be associated with a plurality of feeder circuits that are fed from common bus-bars, the voltage terminals of the wattmeter may be connected directly to the bus-bars.

If it is desired to measure the watts of a circuit with the current traversing the series coils of a wattmeter in opposite directions, the switch of Fig. 16 may also be adapted for reversing the direction of current flow in the series coils by connecting the two terminals of the secondary winding of one of the series transformers respectively to contact terminals that are interposed in the path of movement of the projections pertaining to one of the segments, and the two terminals of the secondary winding of the other transformer to the remaining contact members.

It will be understood that, when the projections pertaining to the segments engage one pair of the terminal members to which the secondaries of the series transformers are connected, currents traverse the series coils of the wattmeter in one direction, and that, when the other pair of terminal members is engaged by the said segments, currents traverse the series coils in the opposite direction. The switch of Figs. 1 to 14, and also of Fig. 15, may also be adapted for reversing the current in the current or series coil of any instrument in a manner similar to that illustrated in Fig. 17.

It will, of course, be understood that the switch here shown and described is not limited in its application to use only with ammeters and wattmeters, but may be employed in connection with any meters or other instruments having current or series coils, or coils adapted to receive currents proportional to currents traversing circuits, and that arrangement of the terminal members and of the connections of the switch other than those specifically illustrated may be employed without departing from the spirit of the invention, and I desire that all such modifications should be included within its scope.

I claim as my invention:

1. A switch comprising adjacent conducting segments, terminal members respectively engaging the said segments, and three side-by-side terminal members that may engage either of two of the segments but only two of which may simultaneously engage one of them.

2. A switch comprising adjacent conducting segments, means for making connections respectively to the said segments, and three unequally spaced terminal members that may engage either of two of said segments but only two of which may simultaneously engage one of them.

3. A switch comprising adjacent conducting segments, terminal members respectively engaging the said segments, and other unequally spaced terminal members that may engage either of two segments and only two of which may simultaneously engage one of them but certain others of which may not simultaneously engage it.

4. A switch comprising two adjacent conducting segments, terminal members respectively engaging the said segments, and three unequally spaced terminal members that may engage either of the two segments, all of the last mentioned terminal members normally engaging one of said two segments.

5. A switch comprising adjacent conducting segments, terminal members respectively engaging the said segments, and other unequally spaced terminal members that may engage either of two segments, all of the last mentioned terminal members normally engaging one of said two segments but only two of them simultaneously engaging the other segment.

6. A switch comprising adjacent conducting segments, terminal members respectively engaging the said segments, and other terminal members that may engage either of two segments and are unequally spaced apart.

7. A switch comprising adjacent conducting segments, one of which is provided with a lateral extension that projects into a corresponding lateral recess in the other, three side-by-side terminal members, the outer terminal members respectively engaging the said segments and the other being adapted to engage either of two of said segments, and other terminal members unequally spaced apart from the inner terminal member and also adapted to engage either of said segments.

8. A switch comprising adjacent conducting segments, one of which is provided with a lateral extension that projects into a corresponding lateral recess in the other, terminal members respectively engaging the said segments, and other unequally spaced terminal members that may be engaged by either of two segments.

9. A switch comprising adjacent conducting segments, one of which is provided with a lateral extension that projects into a corresponding lateral recess in the other, terminal members respectively engaging the said segments, and other unequally spaced terminal members normally engaging the recessed segment but located in the path of movement of the extension of the other segment.

10. A switch comprising adjacent conducting segments, one of which is provided with a lateral extension that projects into a corresponding lateral recess in the other, terminal members respectively engaging the said segments, and other unequally spaced terminal members that may be engaged by either of two of said segments but only two of which may be simultaneously engaged by one of them.

11. A switch comprising adjacent conducting segments, one of which is provided with a lateral extension that projects into a corresponding lateral recess in the other, terminal members respectively engaging the said segments, and other terminal members that may be engaged by either of two of said segments and certain of which are spaced apart a distance less than the width of the said segment extension.

12. A switch comprising adjacent conducting segments, one of which is provided with a lateral extension that projects into a corresponding lateral recess in the other, terminal members respectively engaging the said segments, and other terminal members that may be engaged by either of two of said segments and certain of which are spaced apart a distance less than the width of the said segment extension while certain others are spaced apart a distance greater than said width.

13. The combination with a polyphase circuit, and an instrument, of a switch comprising adjacent conducting segments, connections respectively between the said segments and the instrument, and terminal members that may be engaged by either of two segments and are respectively associated by connection with different phases of the said circuit.

14. The combination with a polyphase circuit, and an instrument, of a switch comprising adjacent conducting segments, connections respectively between the said segments and the instrument, and terminal members that may be engaged by either of two segments and are respectively associated by connection with different phases of the said circuit, certain of said terminal members being arranged to simultaneously engage one of said segments.

15. The combination with a polyphase circuit, and an instrument, of a switch comprising two adjacent but insulated conducting segments, connections respectively between the said segments and the instrument, and terminal members that may be engaged by either of two segments and are respectively associated by connection with different phases of the said circuit, certain of said terminal members being arranged to simultaneously engage one of said segments while certain others are so arranged that they may not simultaneously engage the said segment.

16. A switch comprising conducting segments having adjacent edges of irregular contour, means making continuous connections with the said segments, terminal members that may either singly or simultaneously engage each of said segments, and another terminal member that may engage either of two segments but cannot engage one of them simultaneously with the aforesaid members.

17. A switch comprising conducting segments having stepped adjacent edges, means making connections respectively with the said segments, and three terminal members that may engage either of two segments but only two of which may engage one of the segments simultaneously.

18. A switch comprising conducting segments having stepped adjacent edges, means making connections respectively with the said segments, and terminal members certain of which may simultaneously engage either of two segments and another of which may not engage one of the segments simultaously with the aforesaid members.

19. A switch comprising a plurality of adjacent conducting segments, means for making connections respectively to the said segments, and three terminal members that may engage each of said segments separately but only two of which may simultaneously engage one of them.

In testimony whereof, I have hereunto subscribed my name this 21st day of June, 1911.

HAROLD W. BROWN.

Witnesses:
M. E. EDEN,
B. B. HINES.

Copies of this patent may be obtained for five cents each, by addressing the "Commissioner of Patents, Washington, D. C."